United States Patent [19]

Nii et al.

[11] Patent Number: 4,529,209
[45] Date of Patent: Jul. 16, 1985

[54] HYDRAULIC MACHINE SHAFT SEAL WITH CENTRIFUGAL REMOVAL OF SAND AND SOIL PARTICLES

[75] Inventors: Katsutoshi Nii; Kinpei Okano; Shunzo Tomioka, all of Hitachi, Japan

[73] Assignee: Hitachi, Ltd., Tokyo, Japan

[21] Appl. No.: 511,097

[22] Filed: Jun. 6, 1983

[30] Foreign Application Priority Data

Jul. 7, 1982 [JP] Japan ................. 57-116733

[51] Int. Cl.³ .............................. F16J 15/42
[52] U.S. Cl. ......................... 277/3; 277/25; 277/67; 277/96.1; 277/135
[58] Field of Search ............ 277/3, 13, 14 R, 14 V, 277/25, 67–69, 81 R, 135, 93 R, 96 R, 96.1, 96.2

[56] References Cited

U.S. PATENT DOCUMENTS

| | | | |
|---|---|---|---|
| 1,876,515 | 9/1932 | Emmet | 277/3 X |
| 3,033,577 | 5/1962 | Spiess | 277/3 |
| 3,383,116 | 5/1968 | Carter | 277/96.1 |
| 3,527,465 | 9/1970 | Guinard | 277/96.1 X |
| 4,082,296 | 4/1978 | Stein | 277/3 |

FOREIGN PATENT DOCUMENTS

| | | | |
|---|---|---|---|
| 908692 | 4/1954 | Fed. Rep. of Germany | 277/96 |
| 737230 | 10/1932 | France | 277/96 |
| 2385013 | 10/1978 | France | 277/3 |
| 250171 | 2/1927 | United Kingdom | 277/14 V |
| 735250 | 8/1955 | United Kingdom | 277/96.1 |
| 945265 | 12/1963 | United Kingdom | 277/96.1 |
| 717456 | 2/1980 | U.S.S.R. | 277/96.1 |
| 779695 | 11/1980 | U.S.S.R. | 277/96.1 |

Primary Examiner—Robert S. Ward
Attorney, Agent, or Firm—Beall Law Offices

[57] ABSTRACT

A rotary shaft of a hydraulic machine has a collar projecting radially outwardly therefrom. The rotary shaft and the collar are encased by a casing which carries a seal ring to be pressed against an axial end surface of the collar to form a fluid-tight seal therebetween. The axial end surface of the collar slidingly contacting with the seal ring is provided with a plurality of radial grooves extending from the central portion of the collar to the outer peripheral edge thereof. As the rotary shaft rotates at a high speed, a centrifugal force is generated to separate sand and soil particles from the water within the radial grooves.

11 Claims, 10 Drawing Figures

HYDRAULIC MACHINE SHAFT SEAL WITH CENTRIFUGAL REMOVAL OF SAND AND SOIL PARTICLES

BACKGROUND OF THE INVENTION

1. Field of the Invention

The present invention relates to a shaft sealing apparatus used in hydraulic machineries such as water turbine, pump and so forth for preventing a fluid from leaking out from the working chamber of the hydraulic machine.

2. Description of the Prior Art

Generally, a hydraulic machine such as a water turbine, pump or the like incorporates an impeller attached to a rotary shaft which extends outside a stationary casing of the hydraulic machine so as to be operatively connected to, for example, a generator or a motor. A shaft sealing apparatus is provided in a portion between the stationary casing and the rotary shaft adjacent to the impeller to prevent the fluid of a high pressure in the working chamber of the hydraulic machine from leaking out through an annular gap defined by an outer surface of the rotary shaft and the stationary casing.

Various types of shaft sealing apparatus have been proposed for the hydraulic machines.

One of these known shaft sealing apparatus is so constituted that a seal ring fixed to the stationary casing is abutted against one axial end surface of a collar projecting radially outwardly from an outer periphery of the rotary shaft so as to form a fluid tight seal therebetween. This type of shaft sealing apparatus, however, suffers from the following problem. Namely, when this shaft sealing apparatus is used under a severe condition such as high pressure and high speed, the sliding surface of the seal ring is thermally damaged by a friction heat generated between the sliding surfaces of the seal ring and the collar, so that the seal ring is worn down rapidly and the sliding surface of the collar is also damaged soon. In addition, in the case of a hydraulic machine such as a water turbine which handles water containing sand and soil particles, there is a fear that the sand and soil particles may inconveniently flow into between the sliding surfaces to cause a rapid wear thereof.

In order to obviate this problem the "Water Power & Dam Construction" (February 1977, pp42-45) discloses a shaft sealing apparatus in which clean water is supplied between the sliding surfaces of the collar and the seal ring to not only cool them but also remove the sand and soil particles to prevent rapid wear thereof. It is, therefore, necessary that clean water be introduced to the sliding surfaces to eliminate the particles therefrom. However, the water to be supplied should be fresh, containing no sand and soil particles as well as, the supply of this fresh water has to be made at a sufficiently high pressure so that it may wedge into the gap between the sliding surfaces which are usually pressed to each other at a high pressure to seal the water of the high pressure in the hydraulic machine.

SUMMARY OF THE INVENTION

Accordingly, an object of the present invention is to provide a shaft sealing apparatus having a simple construction, capable of exhibiting a stable seal characteristics even under the severe condition of use such as a high pressure or speed, as well as a distinguished durability even when used in machines handling high-pressure water containing sand and soil particles.

To this end, according to the present invention, there is provided a shaft sealing apparatus in which a plurality of radial grooves are formed in the sliding surface of the collar on the shaft. In consequence, the sand and soil particles are effectively separated from the remainder and are discharged easily by the centrifugal force generated on the collar. In addition, the lubrication and cooling effects on the sliding surfaces are enhanced remarkably.

DETAILED DESCRIPTION OF THE PREFERRED EMBODIMENTS

The features and advantages of the present invention will become clear from the following description of the preferred embodiments taken in conjunction with the accompanying drawings.

Figure 1:
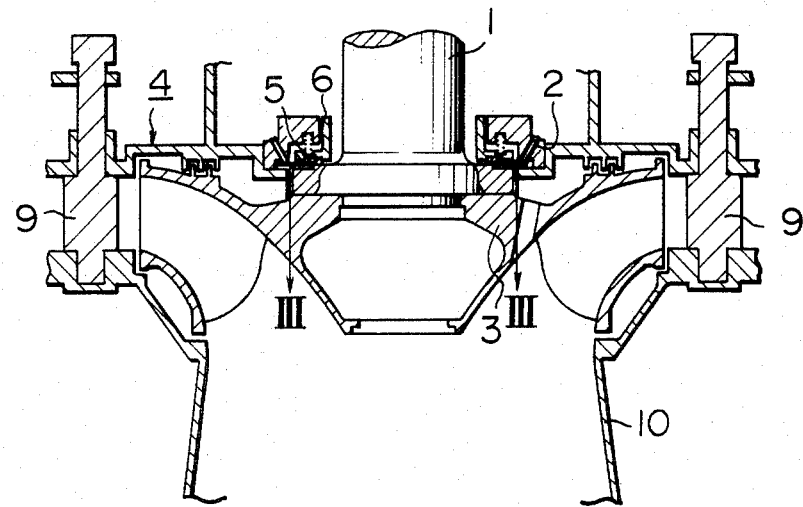
FIG. 1 is a fragmentary sectional view of a Francis turbine incorporating one embodiment of a shaft sealing apparatus according to the present invention.

FIG. 1 shows a shaft sealing apparatus embodying the present invention applied to a Francis turbine. The Francis turbine has a runner shaft 1 carrying a runner 3. The runner shaft 1 is provided at one end portion thereof with a collar 2 projecting radially outwardly therefrom. The runner shaft 1, collar 2 and the runner 3 are encased by a stationary casing 4. A flanged cylindrical seal case 6 has a flange which carries a seal ring 5 made of carbon. The seal case 6 is disposed concentrically around the runner shaft 1 and is supported by the casing 4 for axial movement. Springs 7 are interposed between the casing 4 and the seal case 6 so as to press the seal ring 5 against one axial end surface of the collar 2 to prevent the fluid from leaking out through the sliding portions between the seal ring 5 and the end surface of the collar 2. Furthermore, two "O" rings 8 are disposed between the casing 4 and the outer periphery of the seal case 6 and axially separated from each other to prevent the leakage of the fluid. The runner shaft 1 is operatively connected at the other end thereof to a generator (not shown) through a coupling. A series of interlocked guide vanes 9 are arranged circularly around the runner 3. These guide vanes are adapted to be swung simultaneously to control the flow rate of water coming into the working chamber.

The water introduced into the working chamber acts on the runner 3 to drive the latter and transfer the energy of the water to the runner 3, and the water is discharged through a drain pipe 10.

Figure 2:
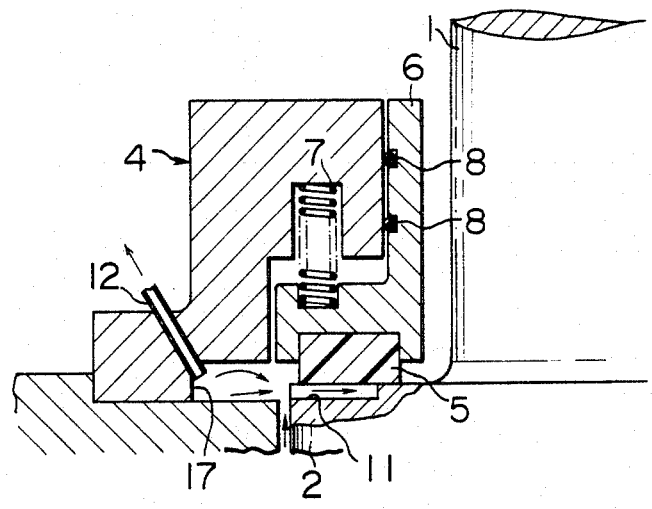
FIG. 2 is a fragmentary enlarged sectional view of the shaft sealing apparatus shown in FIG. 1.
Figure 3:
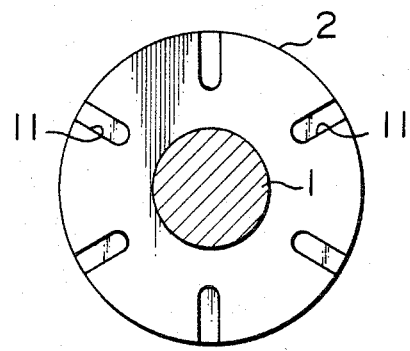
FIG. 3 is a plan view taken along the line III—III of FIG. 1.

As will be seen from FIGS. 2 and 3, the axial end surface of the collar 2 making a sliding contact with the seal ring 5 is provided with a plurality of radial grooves 11 extending from the central portion to the outer peripheral edge of the collar 2. A circumferential recess 17 is formed in a portion of the casing 4 adjacent to the collar 2. A conduit 12 opens at one end thereof into the circumferential recess 17 and comprises at intermediate portion thereof with a valve (not shown). The valve is normally closed.

The operation of this shaft sealing apparatus will be explained hereinunder with specific reference to FIGS. 1 to 3.

The guide vanes 9 are swung to introduce the water of high pressure possessing a high level of energy into the runner 3 to rotate the runner 3 and the runner shaft 1. The high pressure water including particles of sand and soil therein comes into the small gap between the casing 4 and the runner 3 and then comes into the sliding portion between the collar 2 and the seal ring 5. In this portion, sand and soil particles having specific weights greater than that of the water are scattered radially outwardly by means of the centrifugal force generated by the rotation of the collar 2. Although extremely fine particles are allowed to come into the radial grooves 11 in the sliding surface of the collar 2, these fine particles are also scattered radially outwardly by means of the centrifugal force. Therefore, almost no particles of sand and soil are introduced in the sliding portion between the sliding surfaces of the collar 2 and the seal ring 5. Although a slight amount of water leaks out from the sliding portion between the collar 2 and the seal ring 5 into a low-pressure side, i.e. to the atmospheric pressure side, this does not cause any substantial extraordinary wear because the leaked water is materially "fresh" and contains substantially no sand and soil particles. The sand and soil particles separated radially outwardly from the water are accumulated in the recess 17 in the casing 4. After a predetermined amount of sand and soil particles are accumulated, the valve in the conduit 12 is opened to discharge the accumulated sand and soil particles together with the water.

Figure 4:
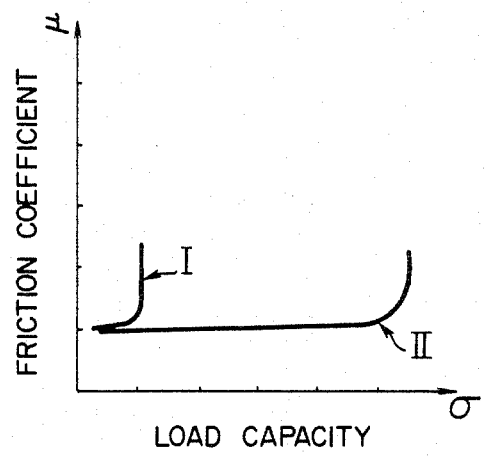
FIG. 4 is a diagram showing the lubrication effect on the shaft sealing apparatus according to the present invention in comparison with that of a conventional shaft sealing apparatus.

In addition to the effect of separating and discharging the sand and soil particles explained above the invention offers an appreciable effect of lubrication and cooling of the sliding portion. Namely, during the running of the hydraulic machine, the water introduced into the sliding portions between the collar 2 and the seal ring 5 forms a liquid film. Although this liquid film is thin, it sufficiently provides a fluid lubrication to the sliding portions. The operational critical surfaces pressure (load capacity) is increased by the provision of the grooves 11. In order to confirm the lubrication effect offered by the present invention, an experiment was conducted to obtain a result as shown in FIG. 4, in which curves I and II represent the characteristics attained by the conventional construction and the construction of the present invention, respectively. It will be understood that the present invention offers a remarkable improvement in the operation critical surface pressure (bearing stress) over the conventional arrangement.

Figure 5:
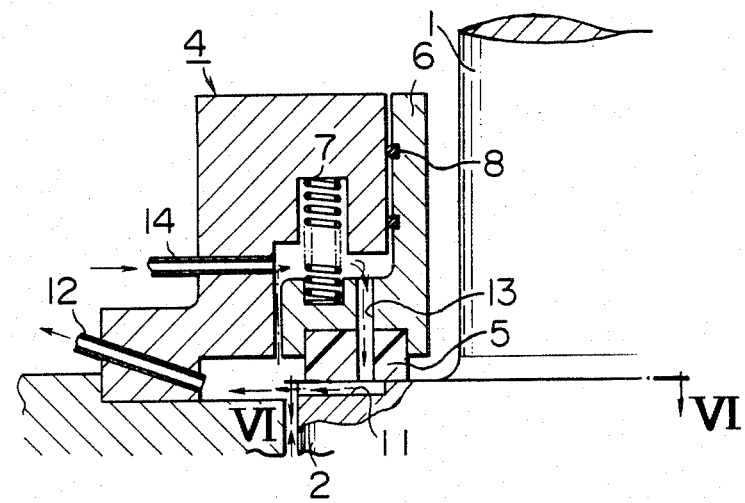
FIG. 5 is a fragmentary enlarged sectional view of another embodiment of the shaft sealing apparatus according to the present invention.
Figure 6:
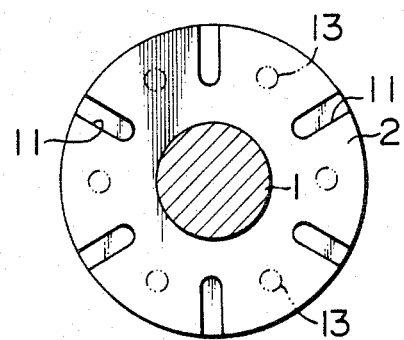
FIG. 6 is a plan view taken along the line VI—VI of FIG. 5.

FIGS. 5 and 6 show another embodiment of the present invention in which a water supplying passage for supplying the fresh water to the radial grooves 11 in the collar 2 is additionally provided. The water supplying passage includes water supplying bore 13 extending through the seal case 6 and the seal ring 5, and water supplying passage 14 extending through the casing 4 and opening to a space between the casing 4 and the seal case 6.

In operation, as in the same manner as the preceding embodiment described in connection with FIGS. 2 and 3, the sand and soil particles contained in the high-pressure water are separated therefrom by means of the centrifugal force generated by the rotation of the collar 2 and finer particles are further separated within the grooves 11 in the collar 2, so that any extraordinary wear of the seal ring 5 may be avoided advantageously. In this embodiment, fresh water of a pressure higher than that of the high-pressure water handled in the hydraulic machine is adapted to be supplied to the grooves 11 through the water supplying passage 14 and the water supplying bore 13. Therefore, the undesirable introduction of sand and soil particles into the sliding portion between the sliding surfaces of the seal ring 5 and the collar 2 is completely avoided to prevent the extraordinary wear of the seal ring 5 without fail.

It is possible to attain this avantageous effect even when the water supplying passage 14 shown in FIG. 5 is omitted. From FIG. 5, it will be seen that a recirculation passage for recirculation of water (shown with broken line arrows) which is indicated by a chain line is provided in the sealing apparatus, which includes a space between the casing 4 and the seal case 6, water supplying bore 13 and the groove 11 in the collar 2. The water recirculated in this recirculation passage naturally undergoes the centrifugal separation caused by the rotation of the collar 2, so that sand and soil particles are separated from the water. In consequence, the water in almost "fresh" state is supplied to the sliding portion to suppress the wear of the sliding surfaces.

Figure 7:
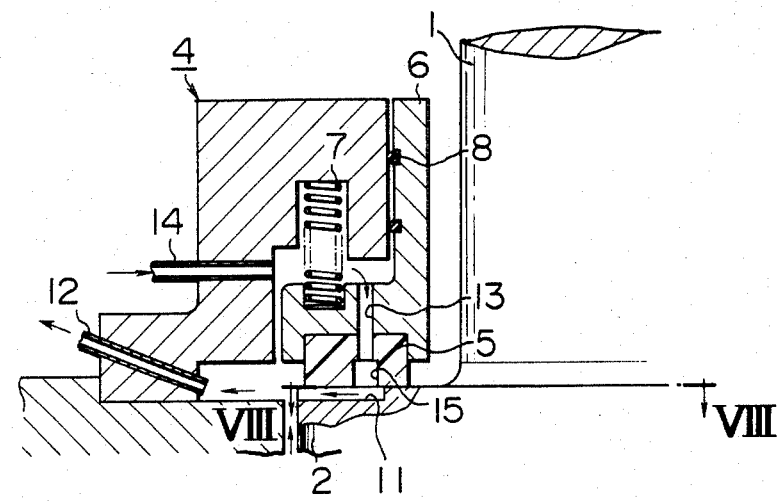
FIGS. 7 and 9 are fragmentary enlarged sectional views of different embodiments of the shaft sealing apparatus according to the present invention.
Figure 8:
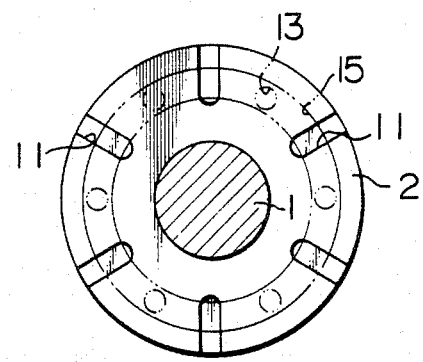
FIGS. 8 and 10 are plan views taken along the lines VIII—VIII and X—X of FIGS. 7 and 9, respectively.

FIGS. 7 and 8 show still another embodiment in which an annular groove 15 is formed in a surface of the seal ring 5 making sliding contact with the collar 2. The groove 15 is adapted to be communicated with the radial grooves 11 in the collar 2. Accordingly, the radial grooves 11 may be communicated with the water supplying bores 13. According to this arrangement, the water supplying bores 13 are always communicated with the radial grooves 11 so that the water is supplied more efficiently to enhance the effect of cooling of the sliding portion between the seal ring 5 and the collar 2.

Figure 9:
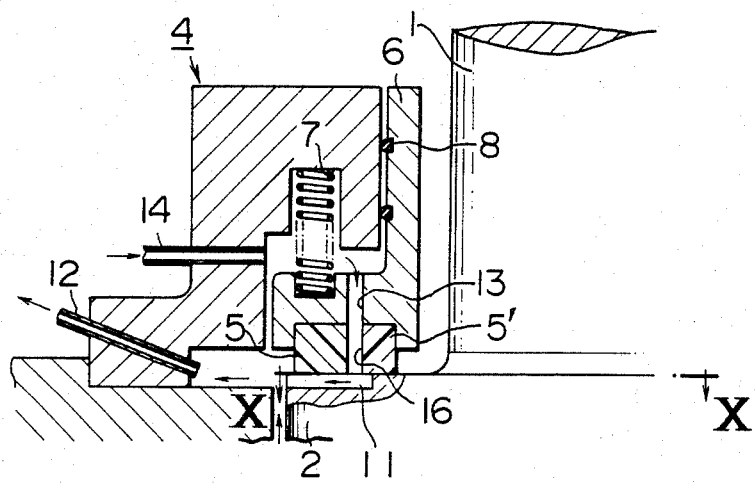
Figure 10:
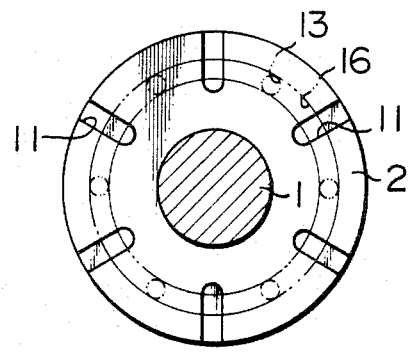

FIGS. 9 and 10 shows a further embodiment having two coaxial seal rings 5, 5' of different diameters, an annular space between two seal rings 5, 5' forming an annular water supplying gap 16 through which water is supplied to the radial grooves 11 in the collar 2. Namely, the water supplying gap 16 is communicated with the water supplying bores 13 in the seal case 6 and remarkably suppresses the wear of the sliding portion between the seal ring 5 and the collar 2 while enhancing the cooling effect appreciably. This arrangement can advantageously be adopted in a large-size machine because the seal ring 5 can be produced as two independent ring-shaped segments.

As will be fully understood from the foregoing description, according to the present invention, it is possible to avoid extraordinary wear of the sliding surfaces of the collar 2 and the seal ring 5. In addition, the present invention offers a remarkable improvement in the lubrication and cooling of these sliding surfaces to ensure a long and stable operation of the hydraulic machine even under the severe condition of use such as high pressure and high speed.

What is claimed is:

1. A hydraulic machine with an improved shaft sealing structure, comprising:

a rotatably mounted shaft having a collar projecting radially outward and a running projecting radially outward, with said collar and runner being axially spaced from each other in fixed relationship on said shaft;

a stationary casing encasing said collar and runner therein with said shaft extending outwardly out of said casing;

said casing forming a working chamber and having fluid guide means passing working fluid to said runner through said casing, through said runner and out of said casing while said shaft, runner and collar rotate;

shaft sealing means between said collar and said stationary casing for preventing working liquid from leaking out of said chamber past said shaft and thereby out of said casing;

said sealing means including a plurality of radial grooves formed to extend radially on an axially facing surface of said collar so that said radial grooves open at their radial outer ends in liquid communication with the working liquid in said chamber for directing working liquid and solid particles contained therein radially outward by centrifugal force during rotation of said collar into fluid communication with said working chamber inside of said casing;

said sealing means further having a sealing surface fixed against rotation with respect to said shaft, liquid sealed with respect to said casing, radially extending and axially facing in the opposite direction to said grooves in contact with said collar surface having said radial grooves, and having a peripherally extending groove facing and in liquid communication with a plurality of said radial grooves; and passage means provided in the stationary portion of said sealing means for passing at least working liquid from said working chamber to said peripherally extending groove so that it will flow radially through said radial grooves together with solid particles remaining in said radial grooves to be discharged by centrifugal force generated by the rotation of said shaft back into liquid communication with said working chamber to thereby remove solid particles from said sealing means and cool the contacting surfaces of said sealing means by passing working liquid in direct heat exchange relationship therewith.

2. The hydraulic machine according to claim 1, further comprising second passage means provided in said stationary casing for supplying a second liquid independent of said working liquid to said first mentioned passage means.

3. The hydraulic machine according to claim 1, wherein said sealing means includes a seal case disposed around said shaft and supported by said stationary casing; and a seal ring fixed to said seal case against rotation and being biased toward and into contact with said collar and having thereon said radial sealing surface, with said seal passage means being provided in said seal case and in said seal ring.

4. The hydraulic machine according to claim 1, further comprising third passage means provided in said stationary casing for discharging particles received in said radial grooves outwardly of said casing.

5. The hydraulic machine according to claim 1, wherein said peripherally extending groove directly axially faces the innermost areas of said radial grooves.

6. The hydraulic machine with an improved shaft sealing structure, comprising:

a rotatably mounted shaft having a collar projecting radially outward and a runner projecting radially outward, with said collar and runner being axially spaced from each other in fixed relationship on said shaft;

a stationary casing encasing said collar and runner therein with said shaft extending outwardly out of said casing;

said casing forming a working chamber and having fluid guide means passing working fluid to said runner through said casing, through said runner and out of said casing while said shaft, runner and collar rotate;

shaft sealing means between said collar and said stationary casing for preventing working liquid from leaking out of said chamber past said shaft and thereby out of said casing;

said sealing means including a plurality of radial grooves formed to extend radially on an axially facing surface of said collar so that said radial grooves open at their radial outer ends in liquid communication with the working liquid in said chamber for directing working liquid and solid particles contained therein radially outward by centrifugal force during rotation of said collar into fluid communication with said working chamber inside of said casing;

said sealing means further having a sealing surface fixed against rotation with respect to said shaft, liquid sealed with respect to said casing, radially extending and axially facing in the opposite direction to said grooves in contact with said collar surface having said radial grooves, and having a peripherally extending groove facing and in liquid communication with a plurality of said radial grooves;

passage means provided in the stationary portion of said sealing means for passing at least working liquid from said working chamber to said peripherally extending groove so that it will flow radially through said radial grooves together with solid particles remaining in said radial grooves to be discharged by centrifugal force generated by the rotation of said shaft back into liquid communication with said working chamber to thereby remove solid particles from said sealing means and cool the contacting surfaces of said sealing means by passing working liquid in direct heat exchange relationship therewith;

a second chamber in liquid communication with the working liquid in said first working chamber through a reduced area passageway;

said radial grooves opening into said second chamber;

said passage means having an inlet in said second chamber adjacent the discharge from said radial grooves, and being axially spaced from a radial plane passing through said radial grooves on the side opposite from said reduced area passage connecting said second chamber to said working chamber so that said passage means will receive clean working liquid as the radially discharged working liquid from said radial grooves moves the heavier solid particles therein past the inlet of said passage means.

7. The hydraulic machine according to claim 6, wherein said second chamber collects said solid particles as they move past said passage means, and further including additional passage means for passing the thus collected solid particles outwardly through said casing.

8. The hydraulic machine according to claim 7, wherein said sealing means includes a seal case disposed around said shaft and supported by said stationary casing; and a seal ring fixed to said seal case against rotation and being biased toward and into contact with said collar and having thereon said radial sealing surface, with said seal passage means being provided in said seal case and in said seal ring.

9. The hydraulic machine accoding to claim 8, wherein said peripherally extending groove directly axially faces the innermost areas of said radial grooves.

10. The hydraulic machine according to claim 9, further comprising second passage means provided in said stationary casing for supplying a second liquid independent of said working liquid to said first mentioned passage means.

11. The hydraulic machine according to claim 6, wherein said peripherally extending groove directly axially faces the innermost areas of said radial grooves.

* * * * *